(12) United States Patent
Chaturvedi et al.

(10) Patent No.: US 12,711,634 B2
(45) Date of Patent: Aug. 18, 2026

(54) VISION SYSTEMS AND METHODS FOR QUEUE MANAGEMENT

(71) Applicant: Sensormatic Electronics, LLC, Boca Raton, FL (US)

(72) Inventors: Yash Chaturvedi, Bangalore (IN); Gopi Subramanian, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 352 days.

(21) Appl. No.: 18/479,541

(22) Filed: Oct. 2, 2023

(65) Prior Publication Data

US 2024/0112354 A1 Apr. 4, 2024

Related U.S. Application Data

(60) Provisional application No. 63/412,756, filed on Oct. 3, 2022.

(51) Int. Cl.
*G06T 7/20* (2017.01)
*G06T 7/60* (2017.01)
(Continued)

(52) U.S. Cl.
CPC .................. *G06T 7/20* (2013.01); *G06T 7/60* (2013.01); *G06V 10/25* (2022.01); *G06V 20/52* (2022.01);
(Continued)

(58) Field of Classification Search
CPC ... G06T 7/20; G06T 7/60; G06T 2207/30241; G06T 2207/30242; G06V 10/25; G06V 20/52; G06V 2201/07
See application file for complete search history.

(56) References Cited

U.S. PATENT DOCUMENTS 11,704,782 B2 * 7/2023 Wakim ................. G06V 40/173 705/5
2009/0153335 A1 * 6/2009 Birtcher ................. G06Q 10/10 340/573.1

(Continued)

OTHER PUBLICATIONS

International Search Report and Written Opinion in PCT/US2023/075850, mailed Dec. 4, 2023, 21 pages.

*Primary Examiner* — Chan S Park
*Assistant Examiner* — Paulo Andres Garcia
(74) *Attorney, Agent, or Firm* — ArentFox Schiff LLP

(57) ABSTRACT

Example implementations include a method, apparatus and computer-readable medium for tracking queue space events, comprising receiving a plurality of data frames from a camera capturing a view of an environment. The implementations further include identifying in the plurality of data frames at least one queue space of the environment, tracking a position of a first person in the plurality of data frames, and calculating a dwell time of the first person when detecting that the position of the first person is in the at least one queue space. Additionally, the implementations include generating a queue delay indication in response to determining that the dwell time exceeds a threshold dwell time, and generating an alert that an attribute of the at least one queue space needs to be modified in response to determining that more than a threshold amount of queue delay indications have been generated within a period of time.

18 Claims, 15 Drawing Sheets

(51) Int. Cl.
*G06V 10/25* (2022.01)
*G06V 20/52* (2022.01)

(52) U.S. Cl.
CPC ............... *G06T 2207/30241* (2013.01); *G06T 2207/30242* (2013.01); *G06V 2201/07* (2022.01)

(56) References Cited

U.S. PATENT DOCUMENTS

| | | | | |
|---|---|---|---|---|
| 2011/0228984 | A1* | 9/2011 | Papke | G06V 20/52 382/103 |
| 2015/0310624 | A1 | 10/2015 | Bulan et al. | |
| 2018/0165904 | A1* | 6/2018 | Setchell | H04N 23/90 |
| 2018/0211300 | A1* | 7/2018 | Tovey | G06T 7/62 |
| 2018/0307891 | A1* | 10/2018 | Hayashi | G07G 1/0036 |
| 2019/0370976 | A1* | 12/2019 | Oya | G07C 11/00 |
| 2020/0226523 | A1* | 7/2020 | Xu | G06V 40/103 |
| 2020/0279103 | A1* | 9/2020 | Sasaki | H04N 7/18 |
| 2020/0401815 | A1 | 12/2020 | Miller et al. | |
| 2021/0097461 | A1* | 4/2021 | Baughman | G06V 20/52 |
| 2021/0241249 | A1* | 8/2021 | DeBardlebon | G06V 20/52 |
| 2022/0309904 | A1 | 9/2022 | Neill et al. | |
| 2023/0048567 | A1* | 2/2023 | Ikeda | G06V 20/52 |

* cited by examiner

VISION SYSTEMS AND METHODS FOR QUEUE MANAGEMENT

CLAIM OF PRIORITY

The present Application for Patent claims priority to U.S. Provisional Application No. 63/412,756 filed on Oct. 3, 2022, and assigned to the assignee hereof and hereby expressly incorporated by reference.

BACKGROUND

Technical Field

The described aspects relate to vision systems, and more specifically, to a vision system configured to detect, track, and manage queue space and corresponding events.

Introduction

Generally, it is observed that nearly 80-90% of customers leave retail stores without buying products as a result of long queues. Long queues in retail stores are often considered one of the key factors that impact sales. Long queues often lead to arguments erupting between customers. Additionally, long queues pose a high risk to the health of customers and employees of the retail store. Such factors instigate customers to switch to other online shopping options, leading to footfall decline and eventually leading to a decline in sales of retail stores.

Conventional systems employ various techniques such as computer vision etc., that need Region of Interest (ROI) to calculate queue length and waiting time. However, such techniques are computationally expensive, complex, and are not highly accurate in some situations. For example, if there are multiple queues in the ROI, queue waiting time and customer dwell time is not accurately determined. Additionally, in some scenarios, queues are not straight, as some retailers have zig-zag shaped queues (such as L-shaped). In such situations, queue management is not efficient. Accordingly, there exists a need for improvements in conventional queue management vision systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for tracking queue space events, comprising receiving a plurality of data frames from a camera capturing a view of an environment. The method further includes identifying in the plurality of data frames at least one queue space of the environment. Additionally, the method further includes tracking a position of a first person in the plurality of data frames. Additionally, the method further includes calculating a dwell time of the first person when detecting that the position of the first person is in the at least one queue space. Additionally, the method further includes generating a queue delay indication in response to determining that the dwell time exceeds a threshold dwell time. Additionally, the method further includes generating an alert that an attribute of the at least one queue space needs to be modified in response to determining that more than a threshold amount of queue delay indications have been generated within a period of time.

Another example aspect includes an apparatus for tracking queue space events, comprising one or more memories and one or more processors, coupled with the one or more memories, wherein the one or more processors are configured to perform the following actions, individually or in combination. The one or more processors are configured to receive a plurality of data frames from a camera capturing a view of an environment. The one or more processors are further configured to identify in the plurality of data frames at least one queue space of the environment. Additionally, the one or more processors are further configured to track a position of a first person in the plurality of data frames. Additionally, the one or more processors are further configured to calculate a dwell time of the first person when detecting that the position of the first person is in the at least one queue space. Additionally, the one or more processors are further configured to generate a queue delay indication in response to determining that the dwell time exceeds a threshold dwell time. Additionally, the one or more processors are further configured to generate an alert that an attribute of the at least one queue space needs to be modified in response to determining that more than a threshold amount of queue delay indications have been generated within a period of time.

Another example aspect includes an apparatus for tracking queue space events, comprising means for receiving a plurality of data frames from a camera capturing a view of an environment. The apparatus further includes means for identifying in the plurality of data frames at least one queue space of the environment. Additionally, the apparatus further includes means for tracking a position of a first person in the plurality of data frames. Additionally, the apparatus further includes means for calculating a dwell time of the first person when detecting that the position of the first person is in the at least one queue space. Additionally, the apparatus further includes means for generating a queue delay indication in response to determining that the dwell time exceeds a threshold dwell time. Additionally, the apparatus further includes means for generating an alert that an attribute of the at least one queue space needs to be modified in response to determining that more than a threshold amount of queue delay indications have been generated within a period of time.

Another example aspect includes a computer-readable medium having instructions stored thereon for tracking queue space events, wherein the instructions are executable by one or more processors, individually or in combination, to receive a plurality of data frames from a camera capturing a view of an environment. The instructions are further executable to identify in the plurality of data frames at least one queue space of the environment. Additionally, the instructions are further executable to track a position of a first person in the plurality of data frames. Additionally, the instructions are further executable to calculate a dwell time of the first person when detecting that the position of the first person is in the at least one queue space. Additionally, the instructions are further executable to generate a queue delay indication in response to determining that the dwell time exceeds a threshold dwell time. Additionally, the instructions are further executable to generate an alert that an attribute of the at least one queue space needs to be modified in response to determining that more than a threshold amount of queue delay indications have been generated within a period of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
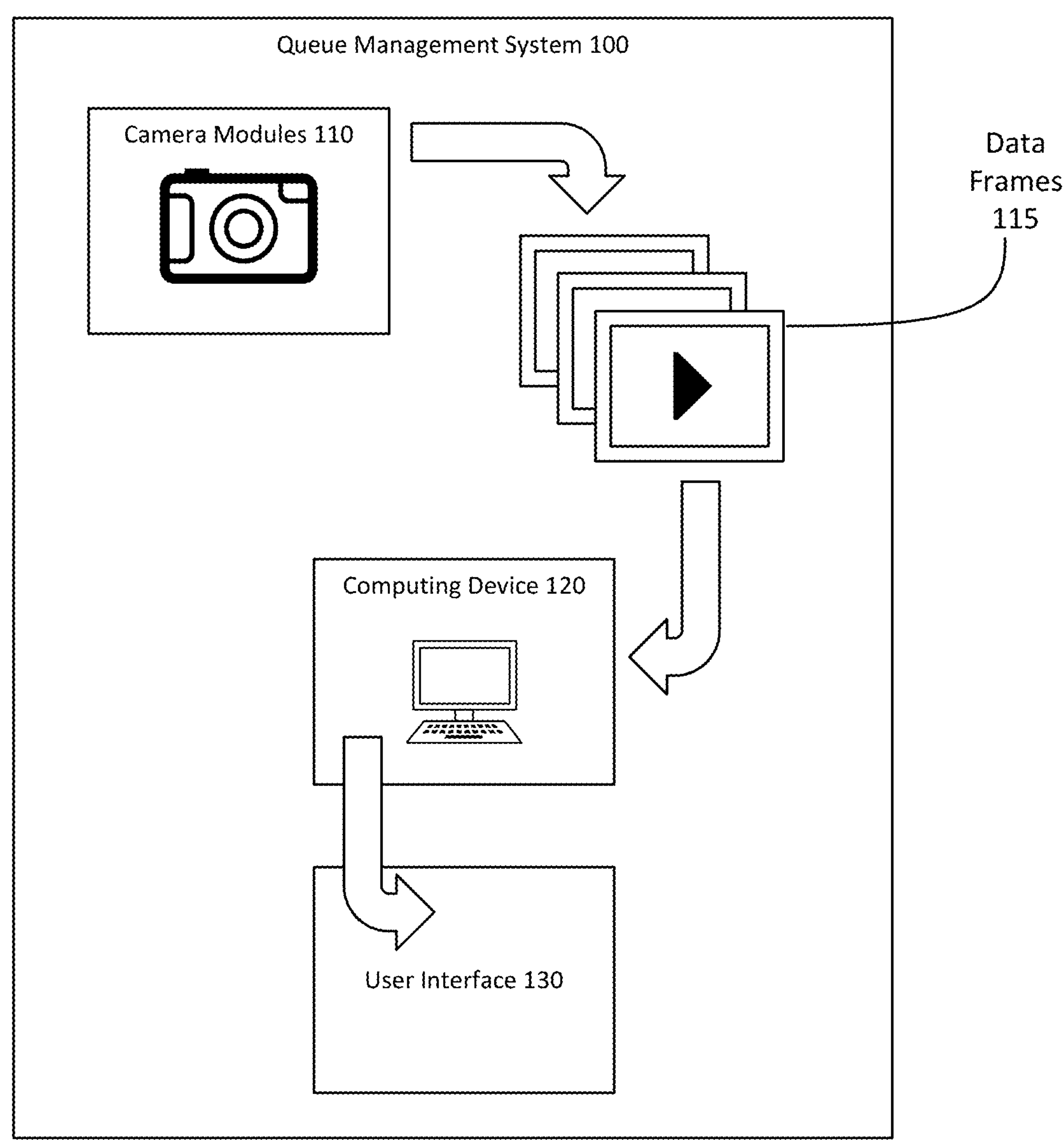
FIG. 1 is a diagram of a queue management system, in accordance with exemplary aspects of the present disclosure.

FIG. 1 is a diagram of a computer vision system, and more particularly, a queue management system 100 for detecting, tracking, and managing queue space events. The queue management system 100 may comprise one or more camera modules 110. In one example, the camera modules 110 may include any combination of image sensors, video cameras, still image cameras, CCTV cameras, and image and video processing systems for monitoring an environment (such as a retail environment). The camera modules 110 may provide video streams pertaining to the environment. The video stream includes a plurality of data frames 115 such as video frames and/or image frames. For example, the camera modules 110 may capture 30 data frames 115 per second. Then, for each second, the video stream includes the 30 captured data frames 115. In some aspects, the camera modules 110 may provide timestamped data frames 115 that may be stored in a database (not shown) of the queue management system 100.

Further, the queue management system 100 may comprise a computing device 120 that generates a user interface 130. In an aspect, the user interface 130 may be implemented using an electronic device associated with a user that can be selected from, but not limited to, wearable devices (e.g., optical head mounted display, smartwatch, etc.), smart phones and/or mobile devices, desktop, computer, laptop and netbook computing devices, tablet computing devices, digital media devices, personal digital assistant (PDA) and any other device having communication capabilities and/or processing capabilities. In some aspects, the user interface 130 may be associated with a user such as an administrator of the retail environment.

In some aspects, the user interface 130 may graphically present information pertaining to the data frames 115 received from camera modules 110 (e.g., bounding boxes, queue space identifiers, etc.). The user interface 130 may also be presented on a secondary computing device (not shown). For example, computing device 120 may be a server that performs computations based on the received data frames 115, and the secondary computing device may be a smartphone or a laptop that presents the results of the computations via the user interface 130. The communication between the computing device 120 and the secondary computing device may be performed via a communication network (e.g., Internet, 4G/5G network, enterprise network, or any other standard network).

In some aspects, the computing device 120 may be implemented as a module of the camera modules 110 or on another device (e.g., server) communicatively coupled to the camera modules 110 for receiving the video streams from the camera modules 110.

Figure 2:
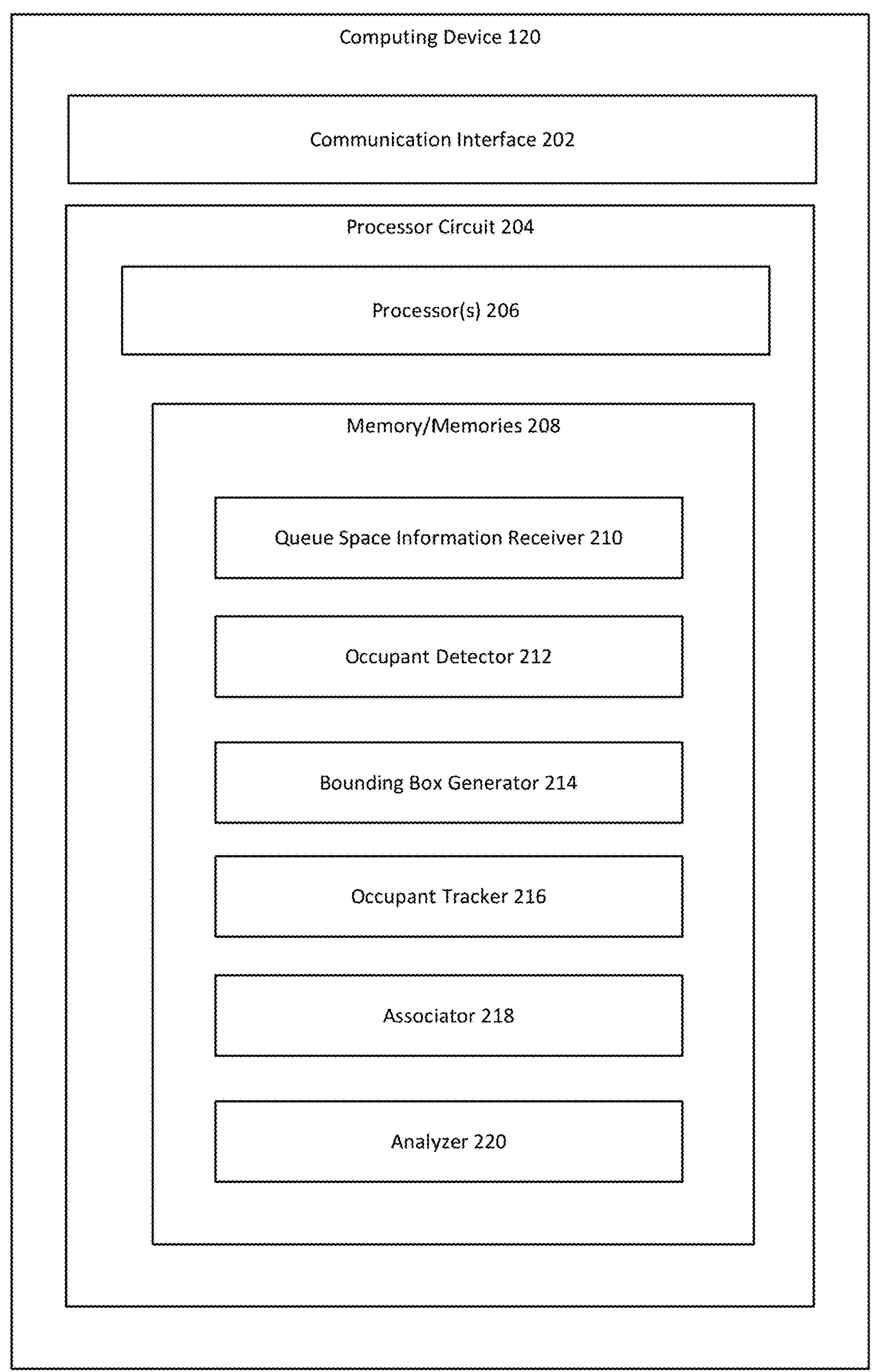
FIG. 2 is a block diagram of a computing device of FIG. 1, in accordance with exemplary aspects of the present disclosure.

FIG. 2 is a block diagram of the computing device 120 of the vision system of FIG. 1. The computing device 120 may comprise a communication interface 202, a processing circuit 204 having one or more processors 206, and one or more memories 208. The computing device 120 may further include a queue space information receiver 210, an occupant detector 212, a bounding box generator 214, an occupant tracker 216, an associator 218, and an analyzer 220. Although one computing device 120 is illustrated, it should be understood that the functionality described herein may be performed across a plurality of distributed computer devices. Similarly, or alternatively, the one or more processors 206 may be coupled with the one or more memories 208 in a manner such that the one or more processors 206, individually or in combination, are configured to perform the functions described herein.

The queue space information receiver 210 is configured to receive one or more data frames 115 pertaining to the environment from one or more camera modules 110 to obtain information on one or more queue spaces. The queue spaces may indicate a predefined space to form a queue (e.g., a queue of customers arriving at a retail environment to perform a transaction). In some aspects, the queue spaces may be determined based on one or more predetermined queue patterns pertaining to the environment. In other aspects, the queue pattern may be determined or inferred by the computing device 120 based on one or more detected queue spaces.

The predetermined or determined/inferred queue patterns may be stored in a database of the queue management system 100, or in the one or more memories 208 of the computing device 120. For example, the queue patterns may be defined based on the position of one or more point-of-sale (POS) counters in the environment such that a start point of the queue space may be near the POS counter. The predetermined queue patterns may be provided by a retailer of the environment.

The queue space information receiver 210, in some aspects, may employ at least one of artificial intelligence (AI), machine learning (ML), and image processing techniques to analyze the data frames 115 to detect one or more queue spaces in the data frames 115. For example, the queue space information receiver 210 may detect the position of one or more POS counters and may utilize a queue pattern to detect one or more queue spaces in the data frames 115. In some aspects, the queue space and/or corresponding queue pattern may be at least one of, but not limited to, a straight line queue, zig-zag queue, L-shaped queue space, or any other shaped queue space/pattern.

Still referring to FIG. 2, the computing device 120 is shown to include the occupant detector 212. The occupant detector 212 is configured to detect a presence of at least one occupant in the data frames 115. The occupant detector 212, in some exemplary aspects, may employ at least one of artificial intelligence, machine learning such as deep learning, and image processing techniques to analyze the data frames 115 to detect presence of the at least one occupant in the data frames 115. In some aspects, the occupant may be detected using an object detection software.

Still referring to FIG. 2, the computing device 120 is further shown to include the bounding box generator 214. The bounding box generator 214 is configured to coordinate with the occupant detector 212 to generate a bounding box around the occupant(s) detected by the occupant detector 212. For clarity, the bounding boxes around the occupant(s) indicates people/customers identified within a data frame. In other words, the bounding box may also represent location of occupant (customer) within the data frame. The bounding box generator 214 may generate a unique identifier for each of the bounding box, where each bounding box corresponds to a single occupant identified within the data frame. In other words, the unique identifier is also associated with the occupant within the bounding box. A count of bounding boxes generated and/or a count of unique identifiers generated may correspond to the number of occupants identified in a particular data frame. Accordingly, the occupants may be identified or referred to by unique identifiers. The occupants may be identified based on the unique identifier provided with the respective bounding boxes.

In an aspect, the queue management system 100 is capable of establishing correspondence between bounding boxes generated for the same occupant identified by multiple cameras within their respective data frames 115. This allows the queue management system 100 to keep track of the occupants from different angles or views. For an example, a first occupant may be visible within the data frames 115 generated by different cameras of the camera modules 110. The first occupant is associated with a single unique identifier regardless of which camera captured the data frame depicting the first occupant. In another aspect, a different unique identifier may be allotted to the bounding boxes generated for data frames 115 received from different cameras for a single occupant.

Still referring to FIG. 2, the computing device 120 is further shown to include the occupant tracker 216. The occupant tracker 216 may be configured to track a current position of the occupant identified within the data frame. In some aspects, the occupant tracker 216 may utilize an object tracking software to track the current position of the occupants. For example, as the occupant moves within an environment, the occupant tracker 216 may track the occupants by comparing images and/or bounding boxes of the occupant in a plurality of data frames 115. In some aspects, the software for detecting and tracking the occupant may be implemented together or separately in different components of the camera modules 110. The occupant tracker 216 may track the current position of the occupant to provide positional co-ordinates of the occupant.

Still referring to FIG. 2, the computing device 120 is further shown to include the associator 218. The associator 218 may obtain the positional co-ordinates of the occupant from the occupant tracker 216 and further compare the positional co-ordinates with positional co-ordinates of at least one queue space in the data frame to determine if the occupant is nearby at least one queue space. The associator 218 may associate the occupant with at least one queue space based on the current position of the occupant with respect to nearest queue space. In other words, occupant projection on the queue space is calculated and shortest projection distance is used as a key to associate the occupant with the queue space. For example, the associator 218 may associate and/or tag the occupant with at least one queue space if the current position of the occupant is within a predetermined threshold distance from the at least one queue space.

Still referring to FIG. 2, the computing device 120 is further shown to include the analyzer 220. The analyzer 220 may analyze the association of the occupant with the at least one queue space by applying at least one of artificial intelligence, machine learning, and image processing techniques.

In one aspect, the analyzer 220 may be configured to determine dwell time of each occupant associated with the queue space. The dwell time may indicate a duration of time spent by an occupant waiting in a queue space. For example, an occupant is standing in the queue space since 4 mins i.e., the dwell time of the occupant. The dwell time may be calculated by analyzing the timestamped data frame and tracking the current position of the occupant detected in the data frame.

In another aspect, the analyzer 220 may be configured to determine an average queue space service time. The average queue space service time may indicate a duration of time in which a queue space is being serviced. The average queue space service time may be the dwell time of an occupant exiting the queue space through a predetermined exit area. For example, the average queue space service time may indicate an average time it will take for an occupant to exit the queue space through the predetermined exit area to complete a billing process at a POS counter.

In another aspect, the analyzer 220 may be configured to determine a queue space abandonment event. The analyzer 220 may detect if one or more occupants except the occupant positioned first in the queue space, abandons the queue space and flag it as a queue space abandonment event. As referred above, the occupant tracker 216 tracks the current position of the occupant. Upon detecting change in the current position of the occupant, for example if the occupant leaves the queue space, and moves in opposite direction of queue movement, then a queue space abandonment event may be detected. In other words, the queue space abandonment event may be detected if the current position of the at least one occupant previously associated with the at least one queue space is beyond a predetermined threshold distance from the queue space. In such case, the associator 218 may remove the association between the occupant and the queue space i.e., the tagging between the occupant and the queue space may be removed. Further, the analyzer 220 may provide one or more notifications over the user interface 130 subsequent to detecting the queue space abandonment event. Additionally, the analyzer 220 may update the average queue space service time of the queue space upon detection of the queue space abandonment event.

In another aspect, the analyzer 220 may be configured to determine a queue space switching event. Queue space switching may indicate one or more occupants switching from one queue space to another queue space. The analyzer 220 may determine the queue space switching event when a current position of the at least one occupant associated with one of the queue space is within a predetermined threshold distance of another queue space. For example, the occupant is associated with a first queue space from a plurality of queue spaces. The occupant tracker 216 tracks the current position of the occupant. After some time, if the occupant is positioned beyond the predetermined threshold distance from the first queue space, then the associator 218 may remove association of the occupant with the first queue space. Further, the associator 218 may associate the occupant with a second queue space of the plurality of queue spaces if the occupant is positioned within the predetermined threshold distance from the second queue space after a predefined threshold time has elapsed. This indicates a queue space switching event of the occupant from the first queue space to the second queue space, as the occupant that was previously associated with the first queue space is now associated with the second queue space. The change in association indicates a queue space switching event. The associator 218 associates the occupant with the second queue space after the predefined threshold time has elapsed in order to verify if the occupant is still positioned within the predetermined threshold distance from the second queue space, as in some situations the occupant may leave the first queue space and move near the second queue space for example, to find a retail item and may return to the first queue space. Further, the analyzer 220 may provide one or more notifications over the user interface 130 to indicate detection of the queue space switching event by the occupant. Additionally, the analyzer 220 may update the average queue space service time for each of the first queue space and the second queue space, upon detection of the queue space switching event by the occupant from the first queue space to the second queue space.

Figure 3:
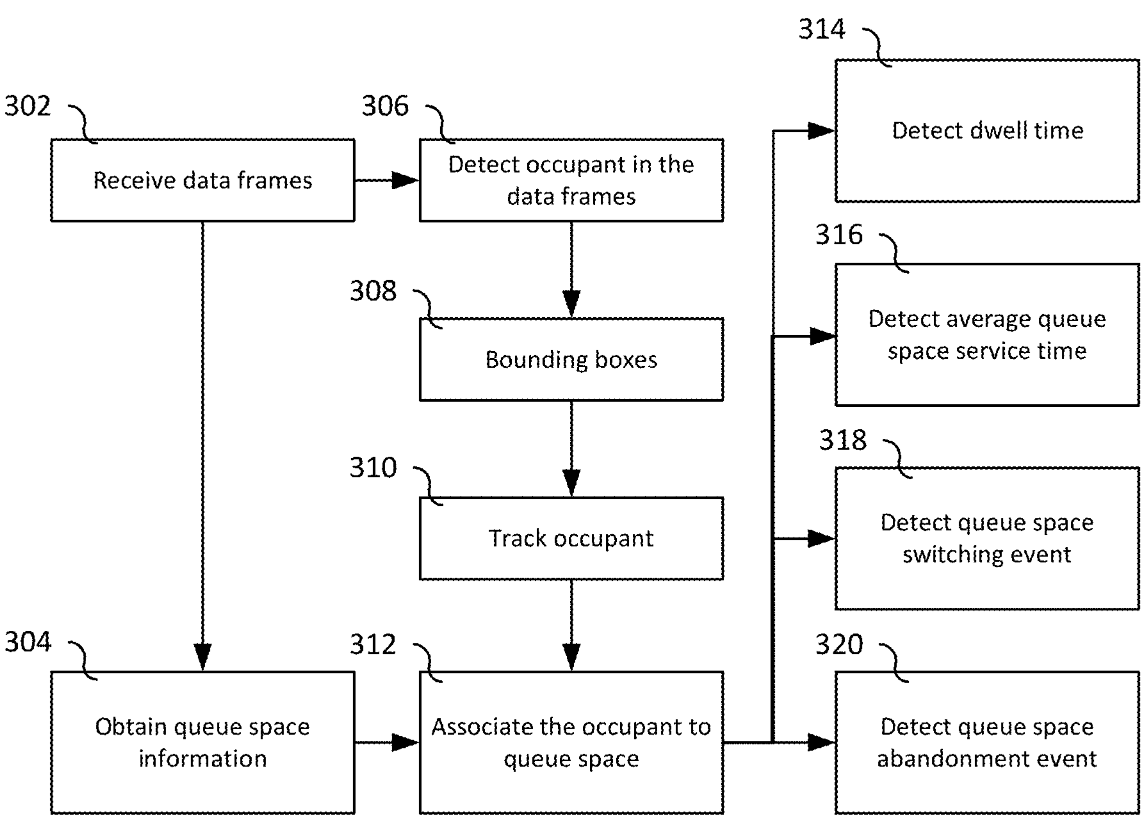
FIG. 3 is a flowchart illustrating a method for queue management, in accordance with exemplary aspects of the present disclosure.

Now referring to FIG. 3, a flowchart illustrating a method 300 for a vision system to detect, track, and manage queue space, is shown in accordance with aspects of the present disclosure. In some aspects, the method 300 is performed by the queue management system 100, and more particularly, by the computing device 120.

The method 300 is shown to include receiving one or more data frames (e.g., video streams) at 302. In some aspects, the video streams may be received from one or more camera modules 110. The video streams may comprise a plurality of data frames 115 such as video frames and/or image frames. In some aspects, timestamped data frames 115 may be received from the camera modules 110.

Further, the method 300 is shown to include receiving information on one or more queue spaces at 304. In some aspects, the queue space information may be received by the queue space information receiver 210 (referred above in FIG. 2). In some aspects, the queue spaces may be obtained based on one or more predetermined queue patterns pertaining to the environment. The predetermined queue patterns may be stored in a database (not shown) of the queue management system 100. For example, the predetermined queue patterns may be defined based on the position of one or more POS (Point of Sale) counters in the environment such that a start point of the queue space may be near the POS counter. The predetermined queue patterns may be provided by a retailer of the environment. In some exemplary aspects, at least one of artificial intelligence (AI), machine learning (ML), image processing techniques may be employed to analyze the data frames 115 to detect one or more queue spaces in the data frames 115. For example, position of one or more POS counters in the data frames 115 may be detected to generate a queue pattern and detect one or more queue spaces in the data frames 115. In some exemplary aspects, the queue space may be at least one of, but not limited to, a straight line queue, zig-zag queue, L-shaped queue space or any other shaped queue space.

Further, the method 300 is shown to include detecting at least one occupant in the data frames 115 at 306. In some aspects, the data frames 115 received from the one or more camera modules 110 may be analyzed using at least one of artificial intelligence, machine learning such as deep learning, and image processing techniques to detect the at least one occupant within the data frames 115. In some exemplary aspects, the occupants may be detected by the occupant detector 212 (referred above in FIG. 2).

Further, the method 300 is shown to include generating a bounding box around the occupant(s) detected in the data frames 115 at 308. In some aspects, the bounding box may be generated by the bounding box generator 214 (referred above in FIG. 2). For clarity, the bounding boxes around the occupant(s) indicates people/customers identified within a data frame. In other words, the bounding box also represents location of occupant (customer) within the data frame. Further, a unique identifier may be generated for each bounding box, where each bounding box corresponds to a single occupant identified within the data frame. In other words, the unique identifier is also associated with the occupant within the bounding box. The count of bounding boxes generated and/or count of unique identifier generated corresponds to the number of occupants identified in a particular data frame. In ambit of the present disclosure, the occupants may be identified or referred by unique identifiers. The occupants may be identified based on the unique identifier provided with the respective bounding boxes.

Further, a correlation may be established between bounding boxes generated for the same occupant identified by multiple cameras within their respective data frames 115. Thereby, allowing the queue management system 100 to keep track of the occupants from different angles or views.

For an example, occupant 1 may be visible within the data frames 115 generated by different cameras of the camera modules 110. Such occupants can also be associated with a single unique identifier. In another aspect, different unique identifier may be allotted to the bounding boxes generated for data frames 115 received from different cameras.

The method 300 is further shown to include tracking current position of the at least one occupant at 310. In some aspects, the current position of the occupant may be tracked by the occupant tracker 216 (referred above in FIG. 2). The current position may be tracked as the occupant moves within the environment, by comparing images/bounding boxes of the occupant in a plurality of data frames 115. In some aspects, the current position of the occupant may be tracked to provide positional co-ordinates of the occupant.

The method 300 is further shown to include associating the occupant with the at least one queue space at 312. In some aspect, the occupant may be associated with the at least one queue space by the associator 218 (referred above in FIG. 2). The positional co-ordinates of the occupants may be compared with positional co-ordinates of the at least one queue space in the data frame to determine if the occupant is nearby at least one queue space. Further, the occupant may be associated with the at least one queue space based on the current position of the occupant with respect to nearest queue space. In other words, occupant projection on the queue space is calculated and shortest projection distance is key to associate the occupant with the at least one queue space. For example, the occupant may be associated with the at least one queue space if the current position of the occupant is within a predetermined threshold distance from the queue space.

The method 300 is further shown to include determining dwell time of the occupant associated with the at least one queue space at 314. In some aspects, the dwell time may be detected by the analyzer 220 (referred above in FIG. 2). In some aspects, the association of the occupant with the at least one queue space may be analyzed using at least one of artificial intelligence, machine learning, and image processing techniques. The dwell time may indicate a duration of time spent by an occupant waiting in a queue space. For example, an occupant that is standing in one or more queue spaces for 4 minutes is associated with 4 minutes of dwell time. The dwell time may be calculated by analyzing the timestamped data frames and tracking the current position of the occupant detected in the data frames relative to an amount of time that the occupant is located in the queue space.

The method 300 is further shown to include determining an average queue space service time at 316. In some aspects, the average queue space service time may be determined by the analyzer 220 (referred above in FIG. 2). The average queue space service time may indicate a duration of time in which a queue space is being serviced. The average queue space service time may be the dwell time of an occupant exiting the queue space through a predetermined exit area. In other words, the average queue space service time may indicate, for example, an average time it will take for an occupant to exit the queue space through the predetermined exit area to complete a billing process at a POS counter.

The method 300 is further shown to include detecting a queue space abandonment event at 320. In some aspects, the queue space abandonment event may be detected by the analyzer 220 (referred above in FIG. 2). If one or more occupants except the occupant positioned first in the queue space, abandons the queue space, then such event may be flagged as a queue space abandonment event. As referred above, the current position of the occupant may be tracked within the data frames 115. Upon detecting change in the current position of the occupant, for example if the occupant leaves the queue space, and moves in opposite direction of queue movement, then a queue space abandonment event may be detected. In other words, the queue space abandonment event may be detected if the current position of the at least one occupant previously associated with the at least one queue space is beyond a predetermined threshold distance from the queue space. In such case, the association between the occupant and the queue space i.e., the tagging between the occupant and the queue space may be removed. Further, one or more notifications may be provided over the user interface 130 subsequent to detecting the queue space abandonment event. Additionally, the average queue space service time of the queue space may be updated upon detection of the queue space abandonment event.

The method 300 is further shown to include detecting a queue space switching event at 318. In some aspects, the queue space switching event may be detected by the analyzer 220 (referred above in FIG. 2). Queue space switching may indicate one or more occupants switching from one queue space to another queue space. The queue space switching event may be determined when a current position of the at least one occupant associated with one of the queue space is within a predetermined threshold distance of another queue space. For example, the occupant is associated with a first queue space from a plurality of queue spaces. The current position of the occupant may be tracked within the data frames 115. After some time, if the occupant is not positioned within the predetermined distance from the first queue space, then the association of the occupant with the first queue space may be removed. Further, the occupant may be associated with a second queue space of the plurality of queue spaces if the occupant is positioned within the predetermined distance from the second queue space after a predefined threshold time has elapsed. This indicates a queue space switching event of the occupant from the first queue space to the second queue space, as the occupant that was previously associated with the first queue space is now associated with the second queue space. The change in association indicates a queue space switching event. The occupant is associated with the second queue space after the predefined threshold time has elapsed in order to verify if the occupant is still positioned within the predetermined distance from the second queue space, as in some situations the occupant may leave the first queue space and move near the second queue space for example, to find a retail item and may return to the first queue space. Further, one or more notifications may be provided over the user interface 130 to indicate detection of the queue space switching event. Additionally, the average queue space service time for each of the first queue space and the second queue space may be updated, upon detection of the queue space switching event by the occupant from the first queue space to the second queue space.

Figure 4:
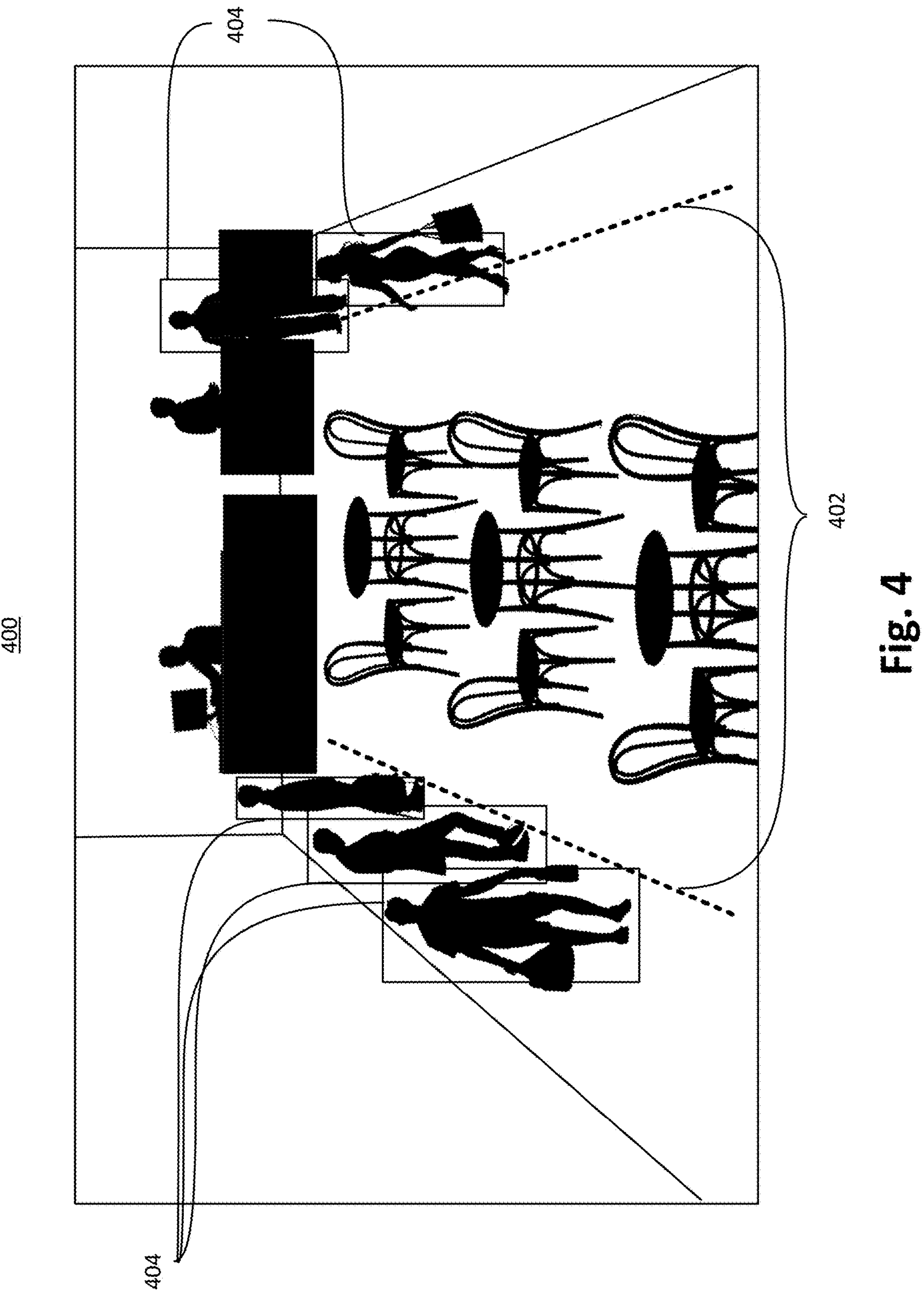
FIG. 4 is a snapshot of a data frame showing a straight line queue space, in accordance with exemplary aspects of the present disclosure.

FIG. 4 illustrates a snapshot 400 showing a data frame pertaining to an environment, such as an example of one or more straight line queue spaces 402 in the data frame. Further, the snapshot 400 shows one or more bounding boxes 404 generated around one or more occupants detected by the occupant detector 212.

Figure 5:
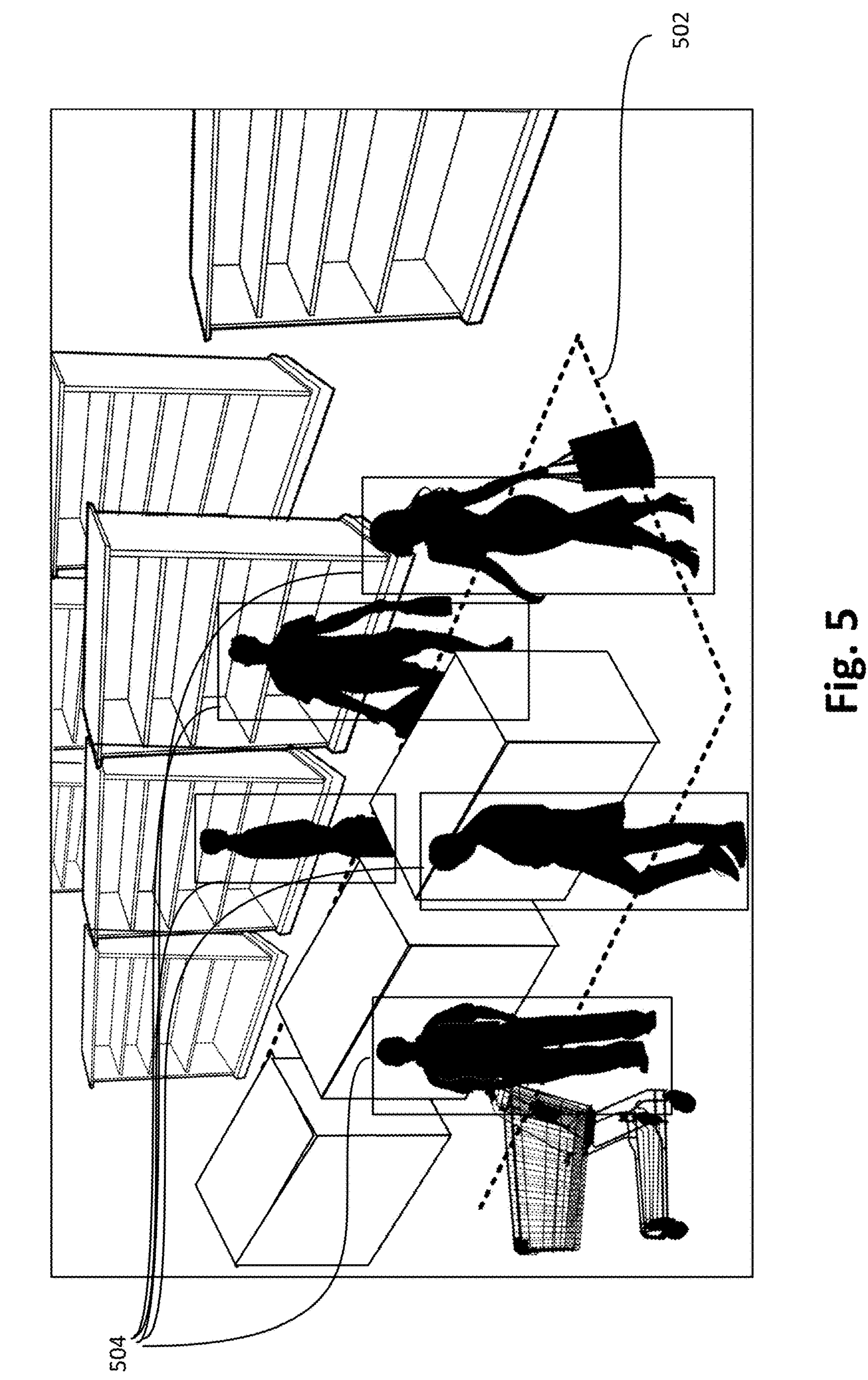
FIG. 5 is a snapshot of a data frame showing a zig-zag queue space, in accordance with exemplary aspects of the present disclosure.

FIG. 5 illustrates a snapshot 500 showing a data frame pertaining to an environment, such as an example of one or more zig-zag queue spaces 502 in the environment. In accordance with the presence disclosure a "zig-zag queue" refers to a queue with at least two changes in direction. For example, when following the queue, a person may go straight, make a first turn (to the right), go straight, make a second turn (to the left), and continue going straight until reaching a cashier. Further, the snapshot 500 shows one or more bounding boxes 504 generated around one or more occupants detected by the occupant detector 212.

Figure 6:
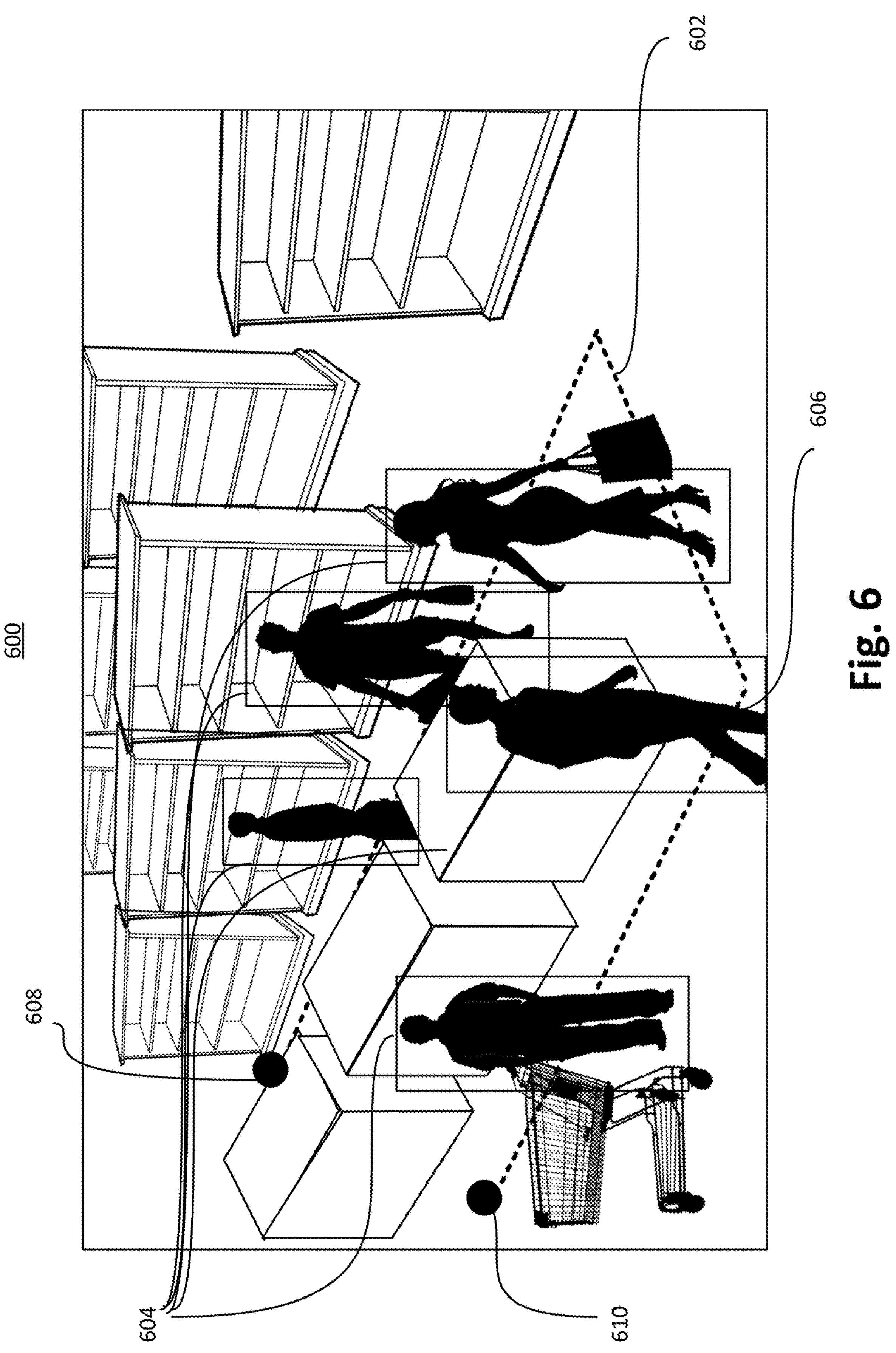
FIG. 6 is a snapshot demonstrating detection of a queue space abandonment event, in accordance with exemplary aspects of the present disclosure.

FIG. 6 illustrates a snapshot 600 showing a data frame pertaining to an environment, and relating to a queue space abandonment event. The snapshot 600 shows one or more queue spaces 602 in the data frame. Further, the snapshot 600 shows one or more bounding boxes 604 generated around one or more occupants detected by the occupant detector 212. Additionally, the snapshot 600 shows a queue space abandonment event by one of the occupants. The analyzer 220 analyzes the association of the occupant with the queue space to determine the queue space abandonment event by the occupant.

Figure 7:
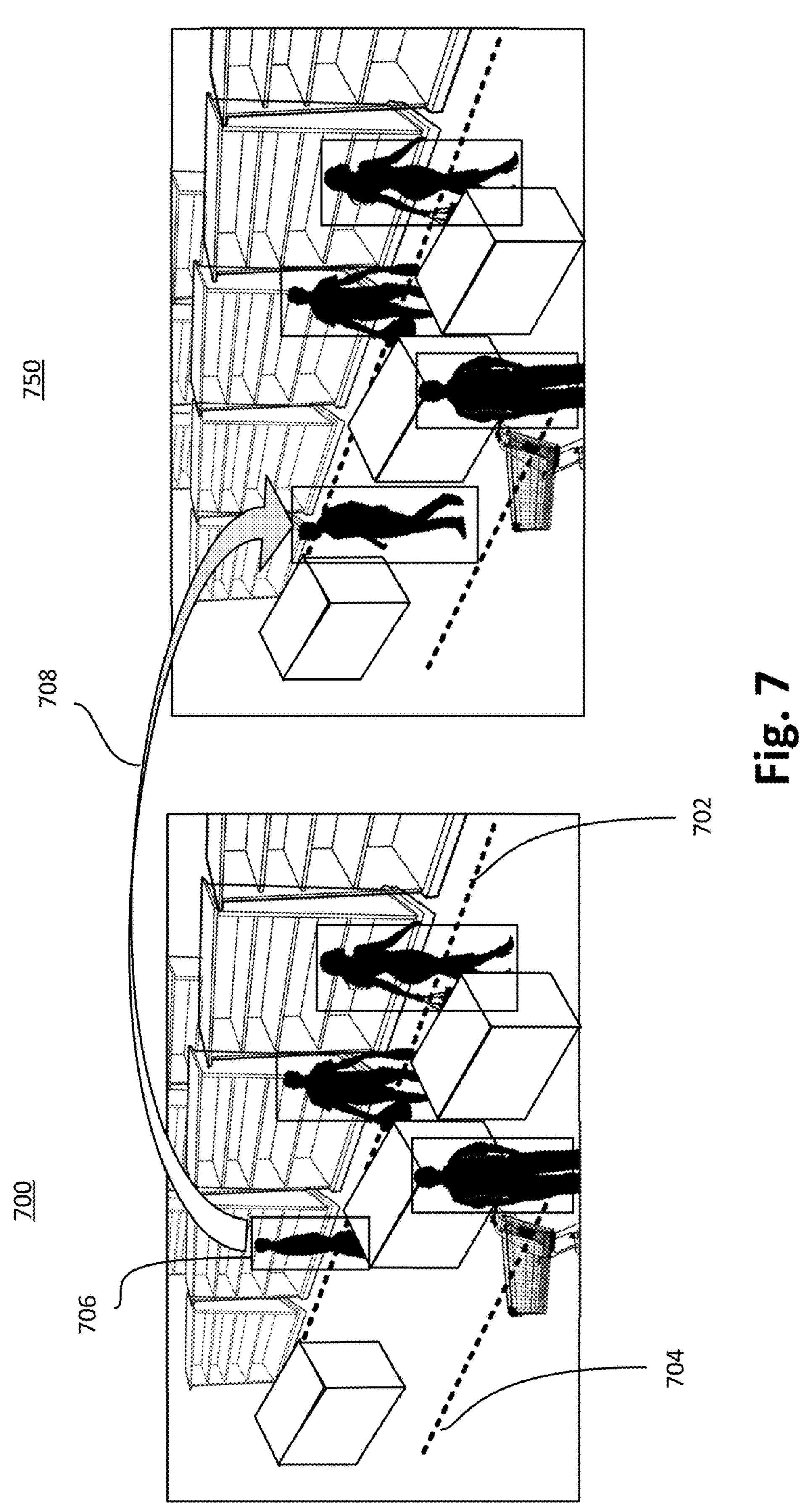
FIG. 7 shows snapshots demonstrating detection of a queue space switching event, in accordance with exemplary aspects of the present disclosure.

FIG. 7 illustrates a snapshot 700 showing a data frame pertaining to an environment, and relating to a queue space switching event. The snapshot 700 show a queue space 702 and a queue space 704 in the data frame. Further, the snapshot 700 shows a bounding box 706 generated around an occupant that is associated with the queue space 702. The snapshot 750 shows the same queue space 702, queue space 704 in the data frame. Further, the snapshot 750 shows the bounding box 706 generated around the occupant. Additionally, the snapshot 750 shows a queue space switching event at 708 by the occupant represented by the bounding box 706, as the occupant switches from the queue space 702 to the queue space 704. The analyzer 220 analyzes the association of the occupant with the queue space to determine the queue space switching by the occupant.

Figure 8:
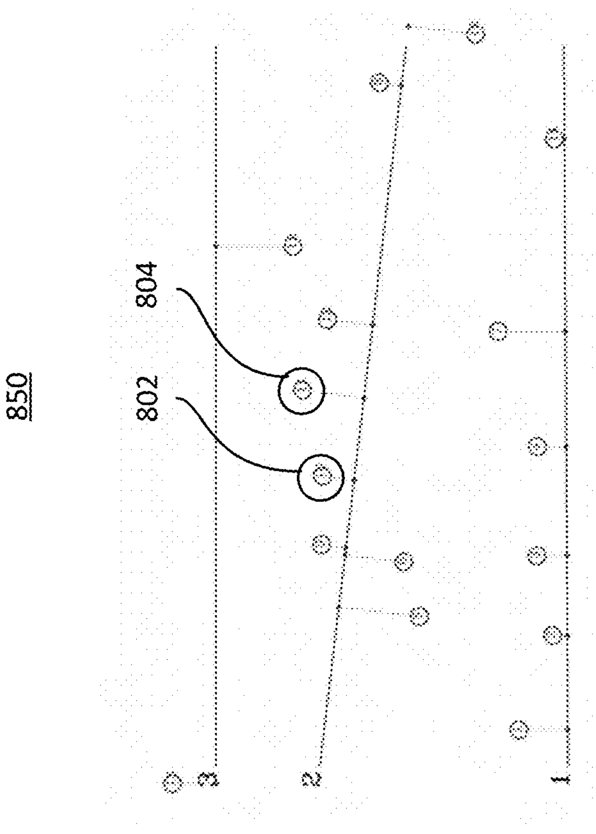
FIG. 8 shows line diagrams demonstrating detection of a queue space switching event, in accordance with exemplary aspects of the present disclosure.
Figure 8:
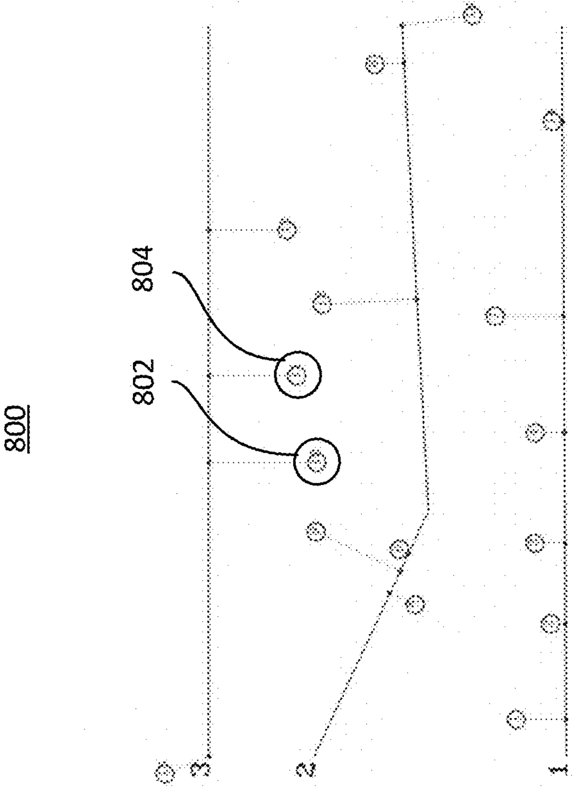

FIG. 8 shows line diagrams 800 and 850 of movement of detected occupants of queue spaces over time demonstrating detection of a queue space switching event, in accordance with aspects of the present disclosure. Line diagram 800 depicts three detected queue spaces 1, 2, and 3. Each bounding box that bounds a detected person has a center point (e.g., the midpoint along the height and the midpoint along the width). This center point is used to calculate whether a person is within a queue space or not. For example, in order to be classified as being in a queue space, the center point needs to be within a threshold distance from the line (i.e., the line passing along the midpoints of the queue space). As shown in line diagram 800, center points 802 and 804 represent two persons. Because the center points are closer to the line of queue space 3, the two persons are identified as occupants of queue space 3. However, suppose that queue space 2 was shifted. As shown in line diagram 850, when queue space 2 is moved closer to center points 802 and 804, because the distance between queue space 2 and the center points is less than the distance between queue space 3 and the center points (assuming every point is within the threshold distance), the two persons are classified as being part of queue space 2.

Figure 9:
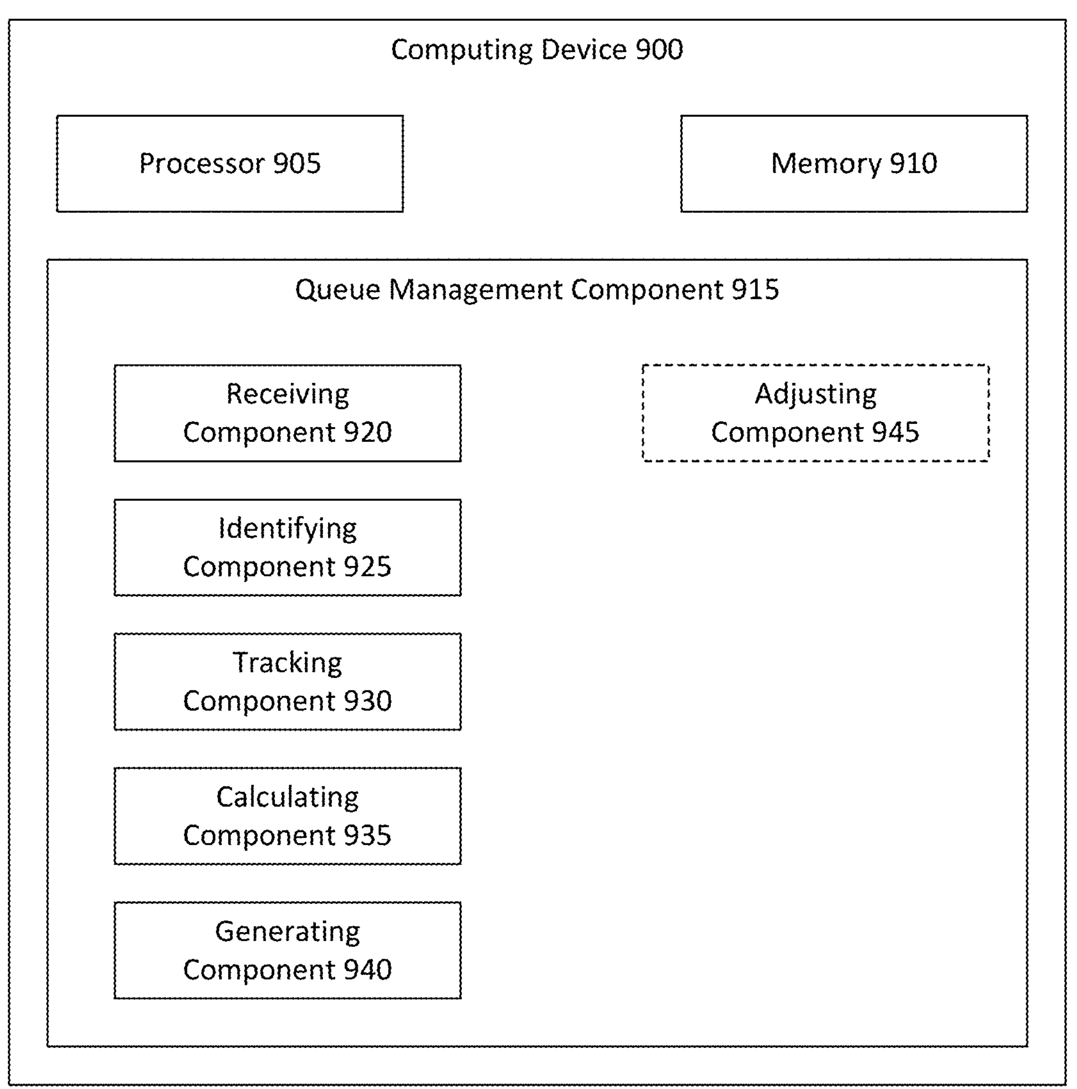
FIG. 9 is a block diagram of an example of a computer device having components configured to perform a method for tracking queue space events.
Figure 10:
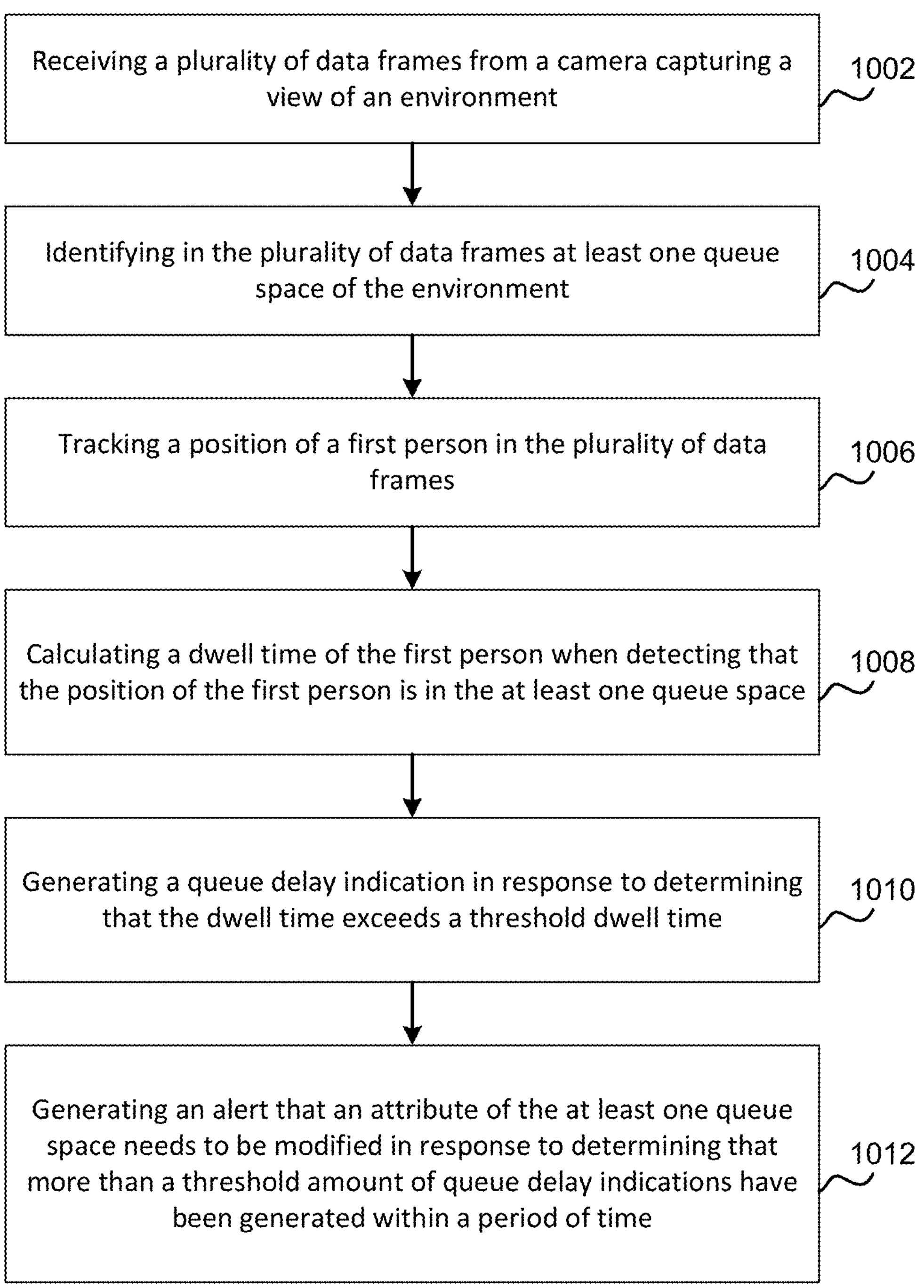
FIG. 10 is a flowchart of an example of a method for tracking queue space events.

Referring to FIG. 9 and FIG. 10, in operation, computing device 900 may perform a method 1000 for tracking queue space events, such as via execution of .queue management component 915 by one or more processors 905 and/or one or more memories 910. It should be noted that computing device 900 may be the same as or a variation of computing device 120. Furthermore, queue management component 915 may perform the functionality of queue space information receiver 210 (via receiving component 920 and identifying component 925), occupant detector 212 (via tracking component 930), bounding box generator 214 (via tracking component 930), occupant tracker 216 (via tracking component 930), associator 218 (via tracking component 930), and analyzer 220 (via calculating component 935 and generating component 940).

At block 1002, the method 1000 includes receiving a plurality of data frames from a camera capturing a view of an environment. For example, in an aspect, computing device 900, one or more processors 905, one or more memories 910, queue management component 915, and/or receiving component 920 may be configured to or may comprise means for receiving a plurality of data frames (e.g., data frames 115) from a camera (e.g., camera modules 110) capturing a view of an environment. For example, the environment may be the interior of a grocery store (particularly the queue space where payments are made).

At block 1004, the method 1000 includes identifying in the plurality of data frames at least one queue space of the environment. For example, in an aspect, computing device 900, one or more processors 905, one or more memories 910, queue management component 915, and/or identifying component 925 may be configured to or may comprise means for identifying in the plurality of data frames at least one queue space of the environment. For example, consider FIG. 4. In snapshot 400, which may be a frame of the plurality of data frames, identifying component 925 may identify queue spaces 402. In some aspects, a user may manually mark the queue space(s) via a graphical user interface that depicts snapshot 400. For example, using a touch screen input, the user may draw two lines that represent the dashed lines shown in snapshot 400.

At block 1006, the method 1000 includes tracking a position of a first person in the plurality of data frames. For example, in an aspect, computing device 900, one or more processors 905, one or more memories 910, queue management component 915, and/or tracking component 930 may be configured to or may comprise means for tracking a position of a first person in the plurality of data frames.

For example, consider FIG. 7 in which a person is detected in snapshot 700 and a bounding box 706 is generated around the person. In this case, tracking component 930 may use an object detection algorithm (e.g., machine learning and/or computer vision) to detect the person using certain features such as facial structure, body parts, clothing, etc.

At block 1008, the method 1000 includes calculating a dwell time of the first person when detecting that the position of the first person is in the at least one queue space. For example, in an aspect, computing device 900, one or more processors 905, one or more memories 910, queue management component 915, and/or calculating component 935 may be configured to or may comprise means for calculating a dwell time of the first person when detecting that the position of the first person is in the at least one queue space.

For example, calculating component 935 may initiate a timer in response to detecting that the first person is in the at least one queue space. As shown in FIG. 7, a person bounded by bounding box 706 is identified in queue space 702 (e.g., the center point of the bounding box 706 is within a threshold distance from the center line of queue space 702 (represented by the dashed line in snapshot 700)). Accordingly, the timer for estimating dwell time continues to run as long as the person is detected in queue space 702. In particular, there may be several consecutive frames (i.e., the plurality of data frames), of which snapshot 700 is one of them, that depict the person in queue space 702. Calculating component 935 may determine the timestamp of the first frame in which the person is detected in the at least one queue space and the timestamp of the last frame in which the person is consecutively detected in the at least one queue space. Calculating component 935 may then determine the dwell time by determining a difference between both timestamps.

At block 1010, the method 1000 includes generating a queue delay indication in response to determining that the dwell time exceeds a threshold dwell time. For example, in an aspect, computing device 900, one or more processors 905, one or more memories 910, queue management component 915, and/or generating component 940 may be configured to or may comprise means for generating a queue delay indication in response to determining that the dwell time exceeds a threshold dwell time.

For example, the person bounded by bounding box 706 may have a dwell time of five minutes. The threshold dwell time may be stored and retrieved from memory 910. It should be noted that there may be a different threshold dwell time for each different queue space. Accordingly, if for the queue space that the first person is located in has a threshold dwell time of four minutes, generating component 940 may determine that the dwell time of the first person exceeds the threshold dwell time.

In some aspects, generating the queue delay indication may include incrementing a delay tally that tracks the amount of times persons have had high dwell times in a queue space. The delay tally may be stored in memory 910.

At block 1012, the method 1000 includes generating an alert that an attribute of the at least one queue space needs to be modified in response to determining that more than a threshold amount of queue delay indications have been generated within a period of time. For example, in an aspect, computing device 900, one or more processors 905, one or more memories 910, queue management component 915, and/or generating component 940 may be configured to or may comprise means for generating an alert that an attribute of the at least one queue space needs to be modified in response to determining that more than a threshold amount of queue delay indications have been generated within a period of time.

For example, with the latest queue delay indication, queue management component 915 may determine that there have been ten delays within an hour (the period of time). If the threshold amount of queue delay indications allowed for an hour is nine delay indications, queue management component 915 may determine that the queue space is failing to provide adequate customer service. Accordingly, generating component 940 may generate an alert indicating that an attribute of the queue space needs to be modified/adjusted.

In an alternative or additional aspect, the attribute is at least one of: an amount of individual queues in the environment (e.g., open a new queue if the queue delays are too long), an amount of employees managing the at least one queue space (e.g., add additional cashiers to process the persons in a given queue faster), a length of the at least one queue space (e.g., shorten the queue to promote usage of alternative queue spaces); or a type of the at least one queue space (e.g., dedicate the queue for a specific purpose such as one of item returns, credit card purchases, cash purchases, exchanges, etc.).

Figure 11:
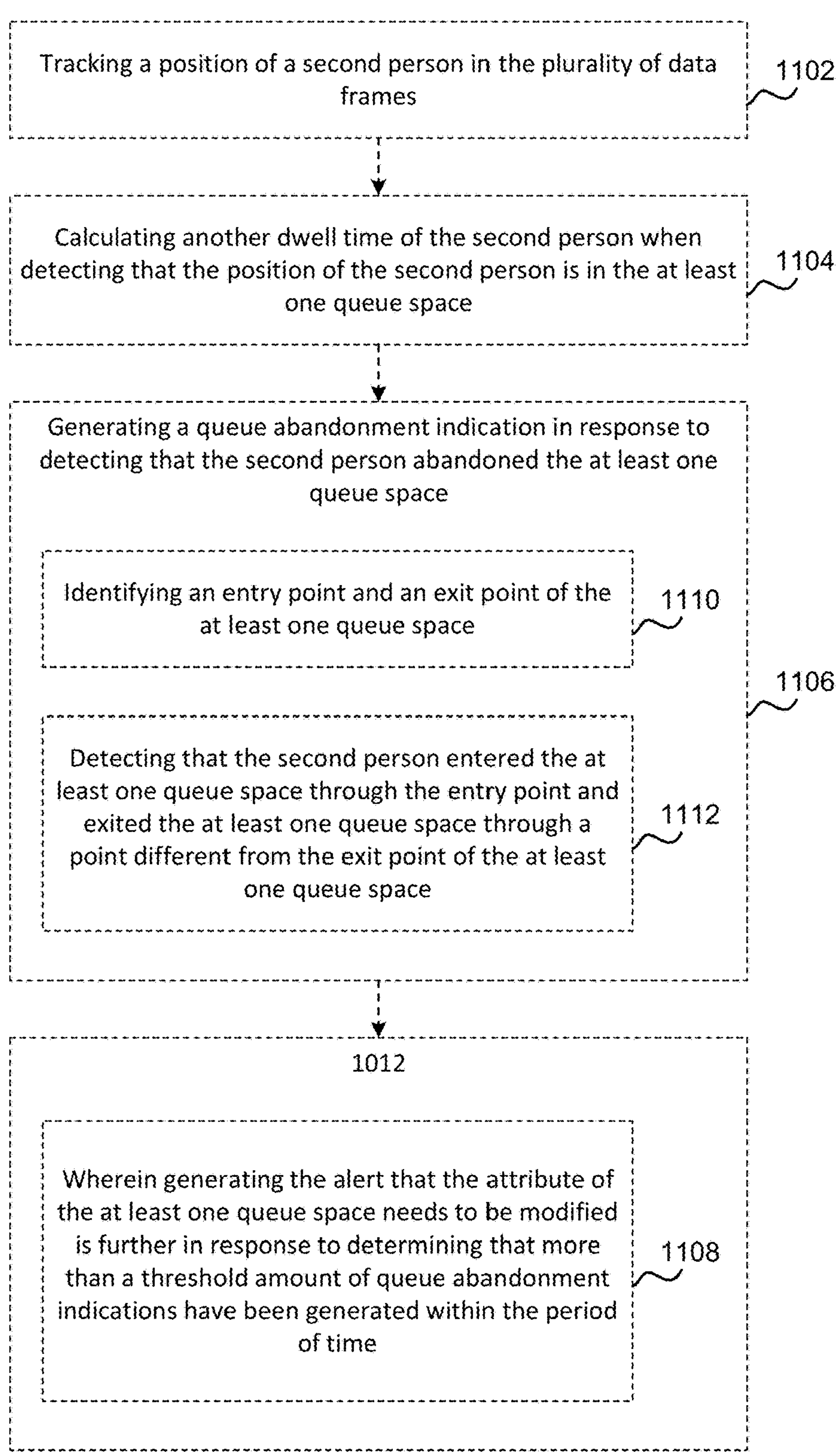
FIG. 11 is a flowchart of additional aspects of the method of FIG. 10.

Referring to FIG. 11, in an alternative or additional aspect, at block 1102, the method 1000 may further include tracking a position of a second person in the plurality of data frames. For example, in an aspect, computing device 900, one or more processors 905, one or more memories 910, queue management component 915, and/or tracking component 930 may be configured to or may comprise means for tracking a position of a second person in the plurality of data frames. Consider that the first person is one of the occupants in FIG. 6 bounded by bounding box 604 and that the second person is bounded by bounding box 606.

In this optional aspect, at block 1104, the method 1000 may further include calculating another dwell time of the second person when detecting that the position of the second person is in the at least one queue space. For example, in an aspect, computing device 900, one or more processors 905, one or more memories 910, queue management component 915, and/or calculating component 935 may be configured to or may comprise means for calculating another dwell time of the second person when detecting that the position of the second person is in the at least one queue space. For example, based on the proximity of person in bounding box 606 to queue space 602, queue management component 915 may determine that the person is standing in queue space 602.

In this optional aspect, at block 1106, the method 1000 may further include generating a queue abandonment indication in response to detecting that the second person abandoned the at least one queue space. For example, in an aspect, computing device 900, one or more processors 905, one or more memories 910, queue management component 915, and/or generating component 940 may be configured to or may comprise means for generating a queue abandonment indication in response to detecting that the second person abandoned the at least one queue space.

For example, in a first frame, the person in bounding box 606 may be located in queue space 602. However, in a second frame, the person may no longer be in queue space 602. If the person is not detected in a threshold number of frames after the second frame (to account for outliers where the person goes undetected due to technical issues or being physically blocked), queue management component 915 may generate a queue abandonment indication, which suggests that the person has abandoned the queue.

In this optional aspect, at block 1110, the generating at block 1106 of the queue abandonment indication in response to detecting that the second person abandoned the at least one queue space may further include identifying an entry point and an exit point of the at least one queue space.

For example, queue space 602 has an entry point 608 and an exit point 610. Queue management component 915 may detect these respective points using movement tracking of a plurality of persons in a queue. For example, if at least a plurality of persons enter a queue starting from a particular point in several data frames, that point is identified as an entry. Likewise if at least a plurality of persons exit a queue from a particular point in several data frames, that point is identified as an exit.

In this optional aspect, at block 1112, the generating at block 1106 of the queue abandonment indication in response to detecting that the second person abandoned the at least one queue space may further include detecting that the second person entered the at least one queue space through the entry point and exited the at least one queue space through a point different from the exit point of the at least one queue space. For example, queue management component 915 may track the movement of the person in bounding box 606. Suppose that the person entered the queue space 602 via entry point 608 in a first frame and progressively moved forward in the queue over a plurality of data frames. The person is deemed to have successfully navigated the queue if the person reaches a threshold distance (e.g., 1-2 feet) from exit point 610 before being undetected in consecutive frames. This is because the person likely made it to the end of the queue and then exited. However, if the person does not reach exit point 610 and is no longer detected in any of the consecutive frames, it is likely that the person exited via a different point in queue space 602. For example, the person is shown to be leaving the queue in FIG. 6.

In this optional aspect, at block 1108, the generating at block 1012 of the alert that the attribute of the at least one queue space needs to be modified is further in response to determining that more than a threshold amount of queue abandonment indications have been generated within the period of time For example, if there have been six indications of a queue being abandoned within an hour and the threshold amount of queue abandonment indications is five (i.e., is exceeded), then queue management component 915 generates the alert that an attribute of the queue space needs to be modified. Again, this is being the queue space is underperforming and cause several persons to abandon the queue.

Figure 12:
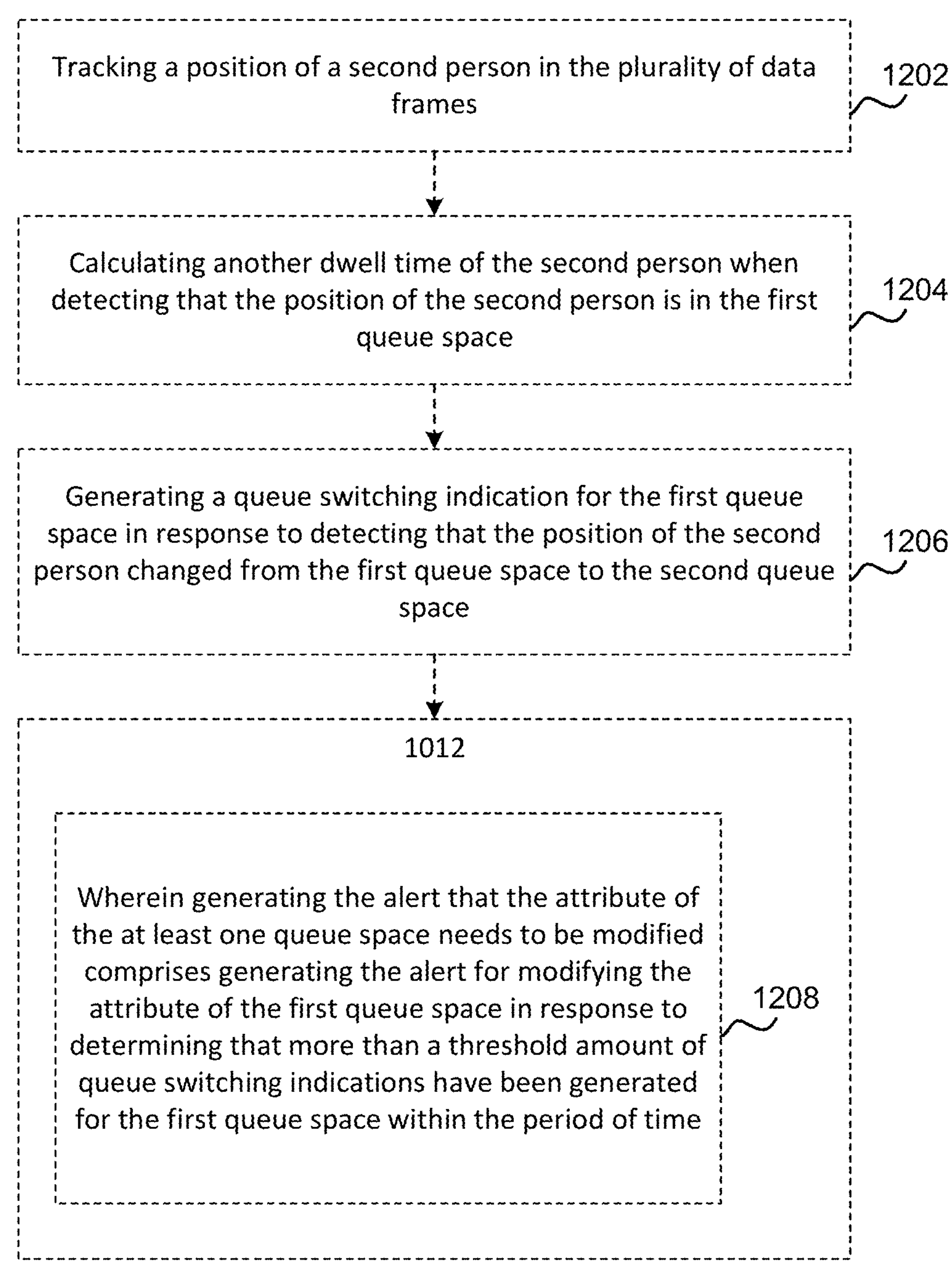
FIG. 12 is a flowchart of additional aspects of the method of FIG. 10.

Referring to FIG. 12, in an alternative or additional aspect wherein the at least one queue space comprises a first queue space (e.g., queue space 702) and a second queue space (e.g., queue space 704), at block 1202, the method 1000 may further include tracking a position of a second person in the plurality of data frames. For example, in an aspect, computing device 900, one or more processors 905, one or more memories 910, queue management component 915, and/or tracking component 930 may be configured to or may comprise means for tracking a position of a second person in the plurality of data frames.

Referring to FIG. 7, suppose that the second person is the person bounded by bounding box 706 and the first person is instead one of the un-labelled occupants of queue spaces 702 and 704. The second person starts in queue space 702, as shown in snapshot 700.

In this optional aspect, at block 1204, the method 1000 may further include calculating another dwell time of the second person when detecting that the position of the second person is in the first queue space. For example, in an aspect, computing device 900, one or more processors 905, one or more memories 910, queue management component 915, and/or calculating component 935 may be configured to or may comprise means for calculating another dwell time of the second person when detecting that the position of the second person is in the first queue space.

In this optional aspect, at block 1206, the method 1000 may further include generating a queue switching indication for the first queue space in response to detecting that the position of the second person changed from the first queue space to the second queue space. For example, in an aspect, computing device 900, one or more processors 905, one or more memories 910, queue management component 915, and/or generating component 940 may be configured to or may comprise means for generating a queue switching indication for the first queue space in response to detecting that the position of the second person changed from the first queue space to the second queue space.

For example, as shown in snapshot 750, the person has exited queue space 702 and has entered queue space 704 (e.g., due to believing that queue space 704 is shorter/faster). Because the center point of bounding box 706 is closer in distance to queue space 704 than queue space 702, queue management component 915 determines that the person is now in queue space 704. However, because the dwell time of the person was non-zero when in queue space 702, queue management component 915 determines that the person switched queues.

In this optional aspect, at block 1208, the generating at block 1012 of the alert that the attribute of the at least one queue space needs to be modified comprises generating the alert for modifying the attribute of the first queue space in response to determining that more than a threshold amount of queue switching indications have been generated for the first queue space within the period of time.

For example, if there are several queue switching indications generated for a certain queue within an hour, it is possible that the queue needs to be modified because there are other queues are performing better. Accordingly, when the threshold amount of queue switching indications is exceeded within a period of time, queue management component 915 generates the alert for attribute modification.

Figure 13:
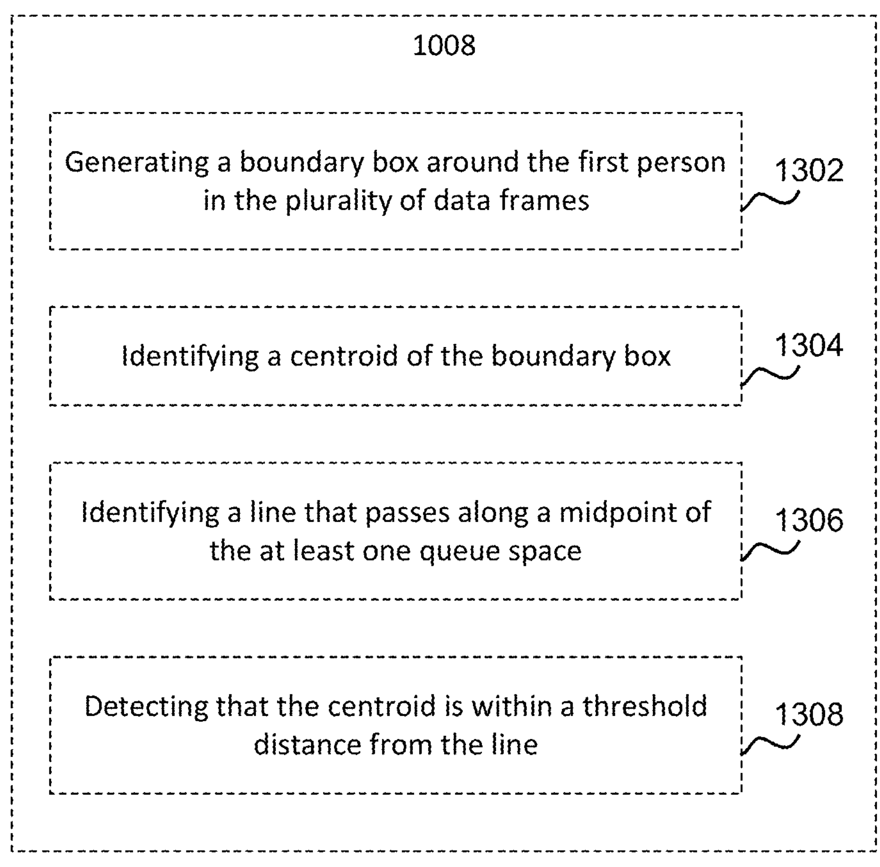
FIG. 13 is a flowchart of additional aspects of the method of FIG. 10.

Referring to FIG. 13, in an alternative or additional aspect, at block 1302, the calculating at block 1008 of the dwell time of the first person when detecting that the position of the first person is in the at least one queue space further includes generating a bounding box (e.g., bounding box 706) around the first person in the plurality of data frames.

In this optional aspect, at block 1304, the calculating at block 1008 of the dwell time of the first person when detecting that the position of the first person is in the at least one queue space further includes identifying a centroid of the bounding box.

In this optional aspect, at block 1306, the calculating at block 1008 of the dwell time of the first person when detecting that the position of the first person is in the at least one queue space further includes identifying a line that passes along a midpoint of the at least one queue space. For example, if a queue space has the shape of a prism, the line that cuts the prism in two equal parts may be identified as the line passing along the midpoints of the queue space. In particular, the line goes along the common trajectory of motion of occupants.

In this optional aspect, at block 1308, the calculating at block 1008 of the dwell time of the first person when detecting that the position of the first person is in the at least one queue space further includes detecting that the centroid is within a threshold distance from the line.

Figure 14:
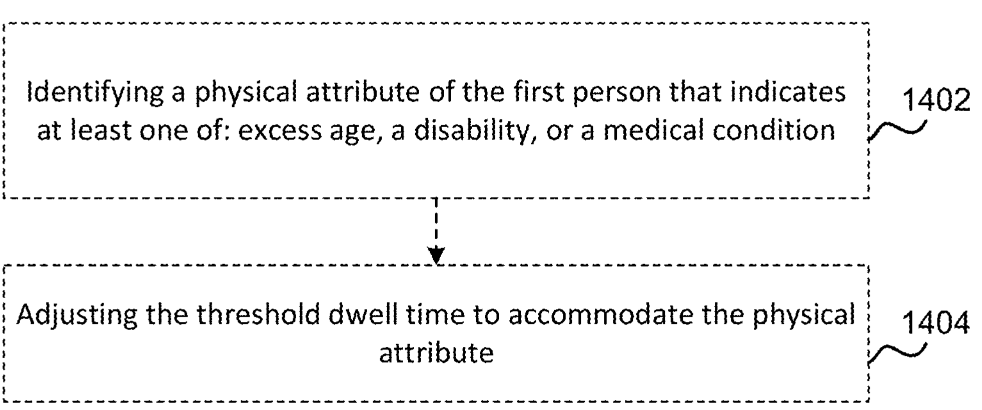
FIG. 14 is a flowchart of additional aspects of the method of FIG. 10.

Referring to FIG. 14, in an alternative or additional aspect, at block 1402, the method 1000 may further include identifying a physical attribute of the first person that indicates at least one of: excess age, a disability, or a medical condition. For example, in an aspect, computing device 900, one or more processors 905, one or more memories 910, queue management component 915, and/or identifying component 925 may be configured to or may comprise means for identifying a physical attribute of the first person that indicates at least one of: excess age (e.g., gray hair, hunched stance, presence of a cane, etc.), a disability (e.g., presence of a wheelchair, crutches, walking stick, etc.), or a medical condition (e.g., a pregnancy).

In this optional aspect, at block 1404, the method 1000 may further include adjusting the threshold dwell time to accommodate the physical attribute. For example, in an aspect, computing device 900, one or more processors 905, one or more memories 910, queue management component 915, and/or adjusting component 945 may be configured to or may comprise means for adjusting the threshold dwell time to accommodate the physical attribute.

For example, the threshold dwell time may be reduced in half (e.g., from 6 minutes to 3 minutes) such that the person is accommodated for their needs. In some aspects, when detecting such persons, queue management component 915 may identify the queue with the least amount of average dwell time (if there are multiple queue spaces) and generate a movement alert that recommends moving the person to a different queue.

Figure 15:
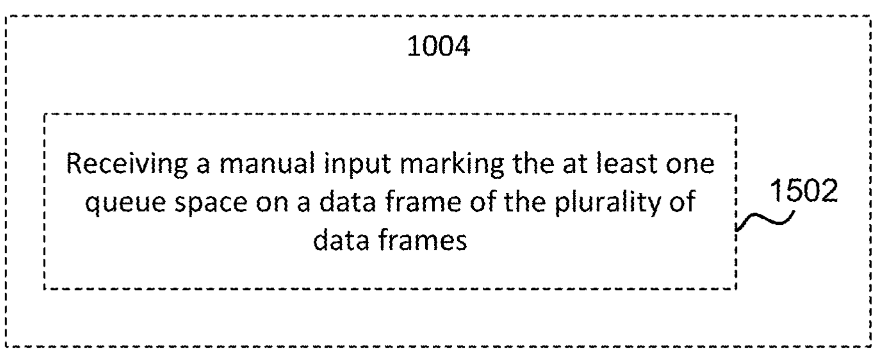
FIG. 15 is a flowchart of additional aspects of the method of FIG. 10.

Referring to FIG. 15, in an alternative or additional aspect, at block 1502, the identifying at block 1004 of in the plurality of data frames the at least one queue space of the environment may further include receiving a manual input marking the at least one queue space on a data frame of the plurality of data frames. For example, the manual input may be received via a touch screen through which the user physically marks where a queue space exists in a frame captured by a certain camera.

Figure 16:
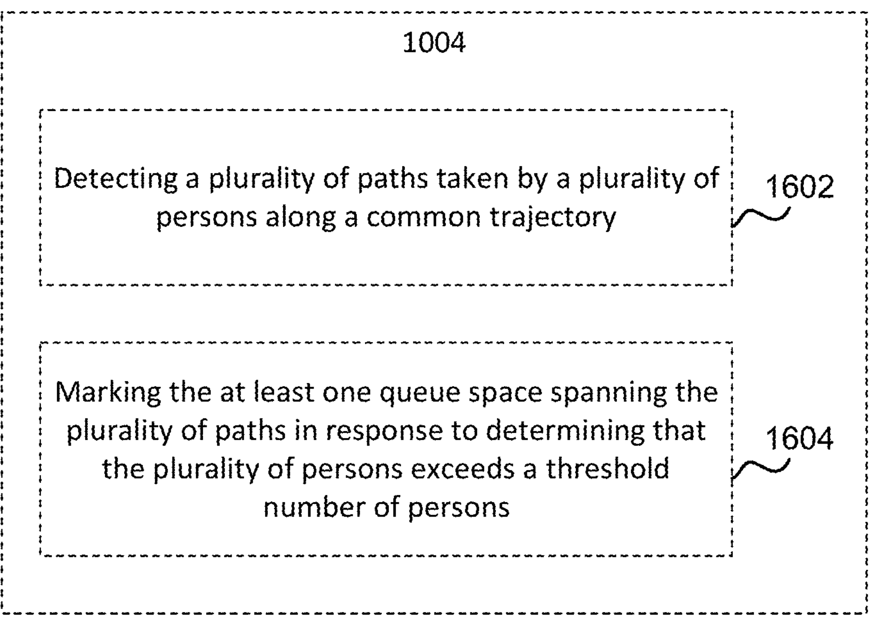
FIG. 16 is a flowchart of additional aspects of the method of FIG. 10.

Referring to FIG. 16, in an alternative or additional aspect, at block 1602, the identifying at block 1004 of in the plurality of data frames the at least one queue space of the environment comprises detecting a plurality of paths taken by a plurality of persons along a common trajectory.

For example, queue management component 915 may identify, over a plurality of data frames, multiple paths (taken by different persons) that stretch from a first point (e.g., entry point 608) and end at a second point (e.g., exit point 610). For each path, queue management component 915 may identify a respective trajectory (e.g., a collection of vectors that make up the path). Queue management component 915 may then average out the respective trajectories to determine the common trajectory.

In this optional aspect, at block 1604, the identifying at block 1004 of in the plurality of data frames the at least one queue space of the environment comprises marking the at least one queue space spanning the plurality of paths in response to determining that the plurality of persons exceeds a threshold number of persons.

For example, if the common trajectory is a straight vector, the queue space associated with the common trajectory may be given by an area where the common trajectory is the midpoint line and each boundary point of the area is a threshold distance away from a corresponding point on the midpoint line.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for tracking queue space events, comprising:

one or more memories; and one or more processors coupled with the one or more memories, wherein the one or more processors are configured, individually or in combination, to:

receive a plurality of data frames from a camera capturing a view of an environment;

identify, in the plurality of data frames, at least one queue space of the environment;

track a position of a first person in the plurality of data frames;

calculate a dwell time of the first person when detecting that the position of the first person is in the at least one queue space;

generate a queue delay indication in response to determine that the dwell time exceeds a threshold dwell time; and generate an alert that an attribute of the at least one queue space needs to be modified in response to determining that more than a threshold amount of queue delay indications have been generated within a period of time.

2. The apparatus of claim 1, wherein the attribute is at least one of:

an amount of individual queues in the environment;

an amount of employees managing the at least one queue space;

a length of the at least one queue space; or a type of the at least one queue space.

3. The apparatus of claim 1, wherein the one or more processors are further configured, individually or in combination, to:

track a position of a second person in the plurality of data frames;

calculate another dwell time of the second person when detecting that the position of the second person is in the at least one queue space;

generate a queue abandonment indication in response to detecting that the second person abandoned the at least one queue space; and wherein to generate the alert that the attribute of the at least one queue space needs to be modified is further in response to determining that more than a threshold amount of queue abandonment indications have been generated within the period of time.

4. The apparatus of claim 3, wherein to generate the queue abandonment indication in response to detecting that the second person abandoned the at least one queue space the one or more processors are further configured, individually or in combination, to:

identify an entry point and an exit point of the at least one queue space; and detect that the second person entered the at least one queue space through the entry point and exited the at least one queue space through a point different from the exit point of the at least one queue space.

5. The apparatus of claim 1, wherein the at least one queue space comprises a first queue space and a second queue space, wherein the one or more processors are further configured, individually or in combination, to:

track a position of a second person in the plurality of data frames;

calculate another dwell time of the second person when detecting that the position of the second person is in the first queue space;

generate a queue switching indication for the first queue space in response to detecting that the position of the second person changed from the first queue space to the second queue space; and wherein to generate the alert that the attribute of the at least one queue space needs to be modified comprises generating the alert for modifying the attribute of the first queue space in response to determining that more than a threshold amount of queue switching indications have been generated for the first queue space within the period of time.

6. The apparatus of claim 1, wherein to calculate the dwell time of the first person when detecting that the position of the first person is in the at least one queue space the one or more processors are further configured, individually or in combination, to:

generate a bounding box around the first person in the plurality of data frames;

identify a centroid of the bounding box;

identify a line that passes along a midpoint of the at least one queue space; and detect that the centroid is within a threshold distance from the line.

7. The apparatus of claim 1, wherein the one or more processors are further configured, individually or in combination, to:

identify a physical attribute of the first person that indicates at least one of: excess age, a disability, or a medical condition; and adjust the threshold dwell time to accommodate the physical attribute.

8. The apparatus of claim 1, wherein to identify, in the plurality of data frames, the at least one queue space of the environment the one or more processors are further configured, individually or in combination, to:

receive a manual input marking the at least one queue space on a data frame of the plurality of data frames.

9. The apparatus of claim 1, wherein to identify, in the plurality of data frames, the at least one queue space of the environment comprises to:

detect a plurality of paths taken by a plurality of persons along a common trajectory; and mark the at least one queue space spanning the plurality of paths in response to determining that the plurality of persons exceeds a threshold number of persons.

10. A method for tracking queue space events, comprising:

receiving a plurality of data frames from a camera capturing a view of an environment;

identifying, in the plurality of data frames, at least one queue space of the environment;

tracking a position of a first person in the plurality of data frames;

calculating a dwell time of the first person when detecting that the position of the first person is in the at least one queue space;

generating a queue delay indication in response to determining that the dwell time exceeds a threshold dwell time; and generating an alert that an attribute of the at least one queue space needs to be modified in response to determining that more than a threshold amount of queue delay indications have been generated within a period of time.

11. The method of claim 10, wherein the attribute is at least one of:

an amount of individual queues in the environment;

an amount of employees managing the at least one queue space;

a length of the at least one queue space; or a type of the at least one queue space.

12. The method of claim 10, further comprising:

tracking a position of a second person in the plurality of data frames;

calculating another dwell time of the second person when detecting that the position of the second person is in the at least one queue space;

generating a queue abandonment indication in response to detecting that the second person abandoned the at least one queue space; and wherein generating the alert that the attribute of the at least one queue space needs to be modified is further in response to determining that more than a threshold amount of queue abandonment indications have been generated within the period of time.

13. The method of claim 12, wherein generating the queue abandonment indication in response to detecting that the second person abandoned the at least one queue space further comprises:

identifying an entry point and an exit point of the at least one queue space; and detecting that the second person entered the at least one queue space through the entry point and exited the at least one queue space through a point different from the exit point of the at least one queue space.

14. The method of claim 10, wherein the at least one queue space comprises a first queue space and a second queue space, further comprising:

tracking a position of a second person in the plurality of data frames;

calculating another dwell time of the second person when detecting that the position of the second person is in the first queue space;

generating a queue switching indication for the first queue space in response to detecting that the position of the second person changed from the first queue space to the second queue space; and wherein generating the alert that the attribute of the at least one queue space needs to be modified comprises generating the alert for modifying the attribute of the first queue space in response to determining that more than a threshold amount of queue switching indications have been generated for the first queue space within the period of time.

15. The method of claim 10, wherein calculating the dwell time of the first person when detecting that the position of the first person is in the at least one queue space further comprises:

generating a bounding box around the first person in the plurality of data frames;

identifying a centroid of the bounding box;

identifying a line that passes along a midpoint of the at least one queue space; and detecting that the centroid is within a threshold distance from the line.

16. The method of claim 10, further comprising:

identifying a physical attribute of the first person that indicates at least one of: excess age, a disability, or a medical condition; and adjusting the threshold dwell time to accommodate the physical attribute.

17. The method of claim 10, wherein identifying, in the plurality of data frames, the at least one queue space of the environment further comprises:

receiving a manual input marking the at least one queue space on a data frame of the plurality of data frames.

18. The method of claim 10, wherein identifying, in the plurality of data frames, the at least one queue space of the environment comprises:

detecting a plurality of paths taken by a plurality of persons along a common trajectory; and marking the at least one queue space spanning the plurality of paths in response to determining that the plurality of persons exceeds a threshold number of persons.

* * * * *